US009054417B2

(12) United States Patent
Lin

(10) Patent No.: US 9,054,417 B2
(45) Date of Patent: Jun. 9, 2015

(54) MANUFACTURING METHOD OF ANTENNA STRUCTURE

(75) Inventor: Chieh-Ming Lin, New Taipei (TW)

(73) Assignee: Auden Techno Corp., Taoyuan County (TW)

( * ) Notice: Subject to any disclaimer, the term of this patent is extended or adjusted under 35 U.S.C. 154(b) by 949 days.

(21) Appl. No.: 13/189,611

(22) Filed: Jul. 25, 2011

(65) Prior Publication Data

US 2013/0027252 A1  Jan. 31, 2013

(51) Int. Cl.
  *H01P 11/00* (2006.01)
  *H01Q 1/38* (2006.01)
  *B29C 45/16* (2006.01)
  *B29C 45/00* (2006.01)
  *B29L 31/34* (2006.01)

(52) U.S. Cl.
  CPC ............. *H01Q 1/38* (2013.01); *Y10T 29/49016* (2015.01); *B29L 2031/3481* (2013.01); *B29L 2031/3456* (2013.01); *B29C 45/16* (2013.01); *B29C 45/0053* (2013.01); *B29C 2045/0058* (2013.01); *B29C 2045/0079* (2013.01)

(58) Field of Classification Search
  CPC ................................................. G06K 19/0723

USPC .......... 29/600–601, 830, 831, 846–847, 852; 343/700 MS, 878, 890, 713–715
  See application file for complete search history.

(56) References Cited

U.S. PATENT DOCUMENTS

| 4,996,391 | A  | * | 2/1991  | Schmidt ......................... 174/255 |
| 5,369,881 | A  | * | 12/1994 | Inaba et al. ..................... 29/846 |
| 7,220,921 | B1 | * | 5/2007  | Sakamoto et al. ............. 174/261 |
| 7,345,645 | B2 | * | 3/2008  | Cho .............................. 343/878 |
| 8,503,848 | B2 | * | 8/2013  | Mathal et al. ................. 385/129 |
| 2010/0000086 | A1 | * | 1/2010 | Yu et al. .......................... 29/846 |

* cited by examiner

*Primary Examiner* — Minh Trinh
(74) *Attorney, Agent, or Firm* — Rosenberg, Klein & Lee

(57) ABSTRACT

A manufacturing method of an antenna structure includes the following steps: producing a main body by injection molding of a first plastic, wherein the first plastic is a plating grade plastic; covering the main body by a second plastic to form a covering layer, wherein plating can not be done for the first and second plastics concurrently; removing a pre-determined portion of the covering layer, wherein a patterned layer is defined by the unremoved portion of the covering layer, wherein at least one trench is formed by the exposed portion of the main body and surrounding patterned layer; and plating an antenna material in the trench to form an antenna. Thus, the instant disclosure can reduce the manufacturing cost of the antenna structure. Based on the preceding manufacturing method, an antenna structure is also disclosed.

3 Claims, 10 Drawing Sheets

MANUFACTURING METHOD OF ANTENNA STRUCTURE

BACKGROUND OF THE INVENTION

1. Field of the Invention

The instant disclosure relates to an antenna structure and a manufacturing method thereof; more particularly, to an antenna structure having an antenna electroplated on a plastic and a manufacturing method thereof.

2. Description of Related Art

Regarding the manufacturing of partial fine circuits of antennas or free-dimensional antennas, the Laser Direct Structuring (LDS) technique developed by LPKF is heavily favored. The technique involves three basic steps: producing a thermoplastic part by injection molding to be laser structured; activating the thermoplastic by a laser beam; and metalizing the thermoplastic by electroless plating.

However, when using the LDS technique, the material selection is restricted and more expensive. In addition, the purchasing cost of the laser system for applying the LDS technique is very expensive, at approximately $15,000,000~33,000,000 NTD (New Taiwanese Dollar) each. The steep financial investment is not favorable for the advancement of antenna industry.

SUMMARY OF THE INVENTION

One object of the instant disclosure is to provide an antenna structure and a manufacturing method thereof. The antenna structure can be manufactured by commercially available laser assembly and materials.

For the manufacturing method, the steps include: producing a main body using injection molding of a first plastic, which can be electroplated; covering the main body with a second plastic by injection molding to form a covering layer, wherein the second plastic can not be electroplated with the first plastic simultaneously; removing a pre-determined portion of the covering layer, wherein the unremoved portion of the covering layer is referred as a patterned layer, wherein at least one trench is formed by the exposed portion of the main body and the surrounding patterned layer; and electroplating an antenna material into the trench to form an antenna.

The antenna structure includes a main body, a patterned layer, and an antenna. The patterned layer is disposed on the outer surface of the main body, wherein at least one trench is formed by the exposed portion of the main body and the surrounding patterned layer. The antenna is disposed in the trench.

Based on the above, the antenna structure and the manufacturing method thereof can reduce the manufacturing cost of the antenna structure and promote the advancement of antenna industry.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
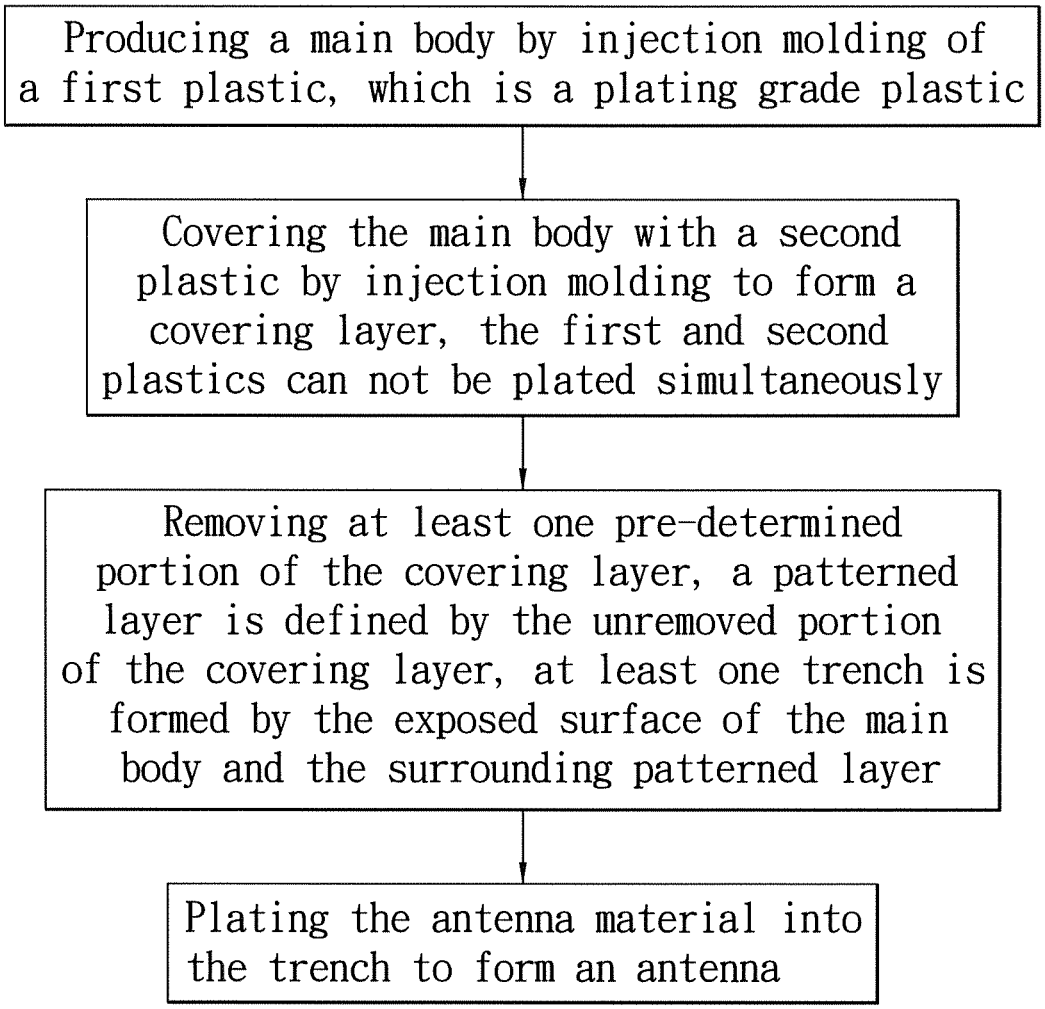
FIG. 1 is a flow diagram illustrating steps of a manufacturing method of an antenna structure for a first embodiment of the instant disclosure.

Please refer to FIG. 1 to FIG. 8A, which show a first embodiment of the instant disclosure, wherein FIG. 1 shows the steps of a manufacturing method of an antenna structure, and FIG. 2 to FIG. 8A illustrate the respective steps, which are described below.

Figure 2:
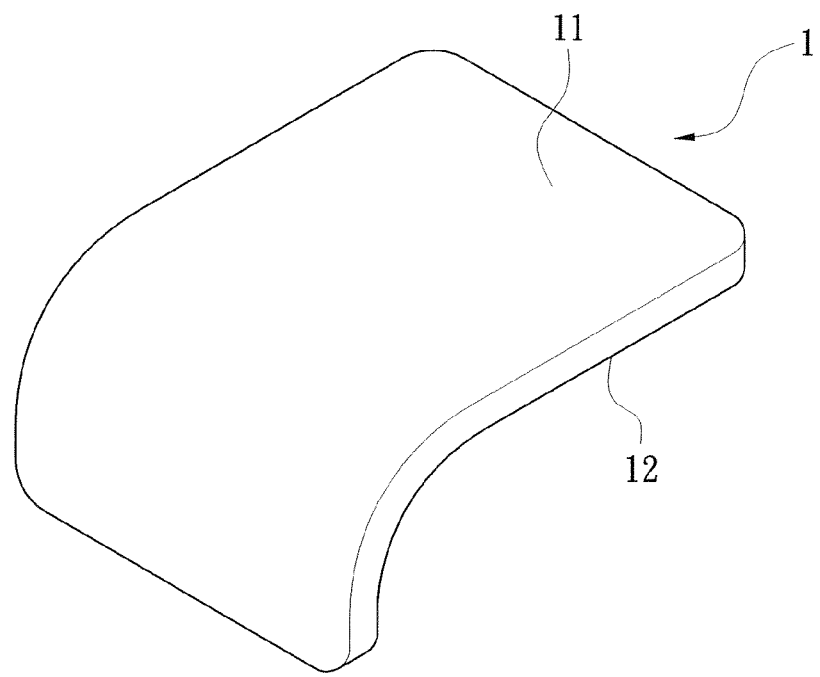
FIG. 2 is a perspective view illustrating a main body of the antenna structure for the first embodiment of the instant disclosure.

Please refer to FIG. 2, which shows a main body 1 produced by injection molding of a first plastic. The main body 1 has an opposing first surface 11 and a second surface 12. The first plastic is a plating grade plastic, which may be ABS (acrylonitrile butadiene styrene), PC (poly-carbonate), PS (polystyrene), PE (polyethylene), PA (polyamide), PMMA (poly-methyl methacrylate), FPR (fiber reinforced plastic), or other suitable plating grade plastics. The preceding PA is also called Nylon. Presently, Nylon 6 and Nylon 6,6 are used preferably for electroplating due to better stability.

Figure 3:
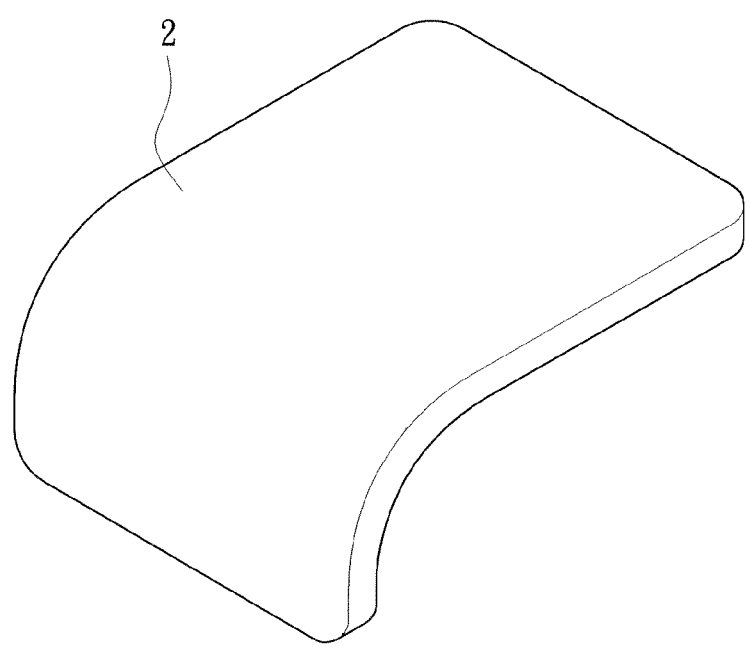
FIG. 3 is a perspective view illustrating a covering layer disposed over the main body of the first embodiment of the instant disclosure.

Please refer to FIG. 3. The main body 1 is spread with a second plastic by injection molding, thus forming a covering layer 2. The thickness of the covering layer 2 can be changed according to the designer. This second plastic can not be electroplated with the first plastic simultaneously, i.e., the plating solution of the second plastic is different versus the first plastic, or the second plastic is a non-plating grade plastic. If the second plastic is indeed a non-plating grade plastic, the second plastic may be rubber, PET (polyethylene terephthalate), or other non-plating grade plastic.

Figure 4:
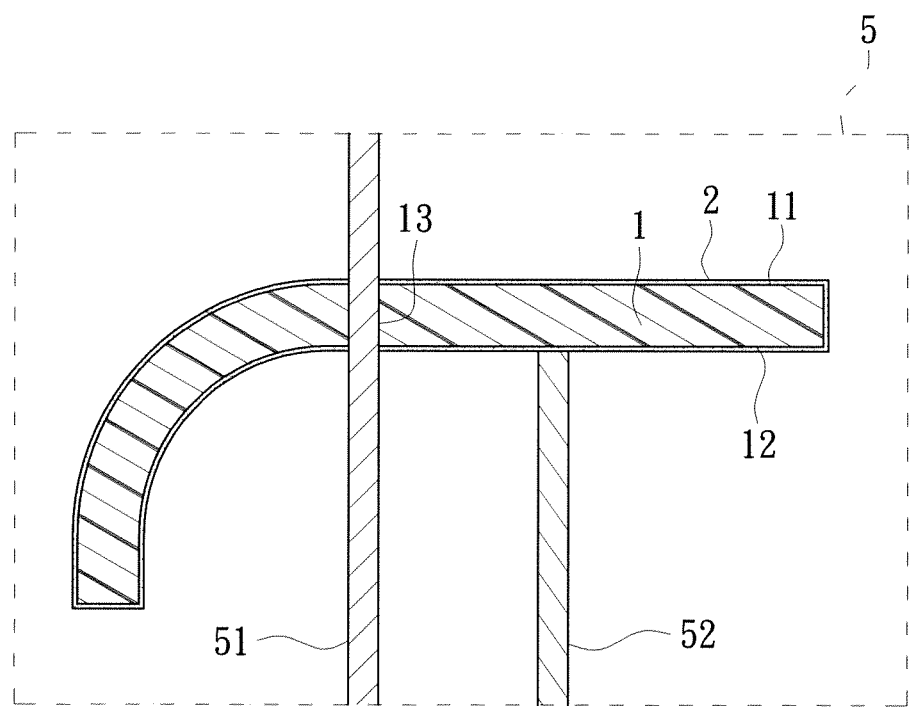
FIG. 4 is a sectional view illustrating the main body disposed in a mold of the first embodiment of the instant disclosure.

Please refer to FIG. 4. When forming the main body 1, at least one through hole 13 is projected through the first and second surfaces 11 and 12. Then, the main body 1 is disposed in a mold 5, and the second surface 12 and the through hole 13 of the main body 1 are fixed therein. The mold 5 has at least one positioning element 51 and a supporting column 52. When the second surface 12 and the through hole 13 of the main body 1 are disposed in the mold 5, the positioning element 51 passes through the through hole 13 of the main body 1, and the supporting column 52 abuts the second surface 12 of the main body 1. Thus, the main body 1 can be fixed in the mold 5 securely, which allows the covering layer 2 to be formed more steadily. However, in use, the positioning manner of the main body 1 is not limited thereto.

After the covering layer 2 is formed on the main body 1, the abutted portion of the second surface 12 by the supporting column 52 is not coated by the covering layer 2. This exposed surface of the main body 1 and the adjacent deposition of the covering layer 2 define a recessed spot 14, as shown in FIG. 5A.

Figure 5:
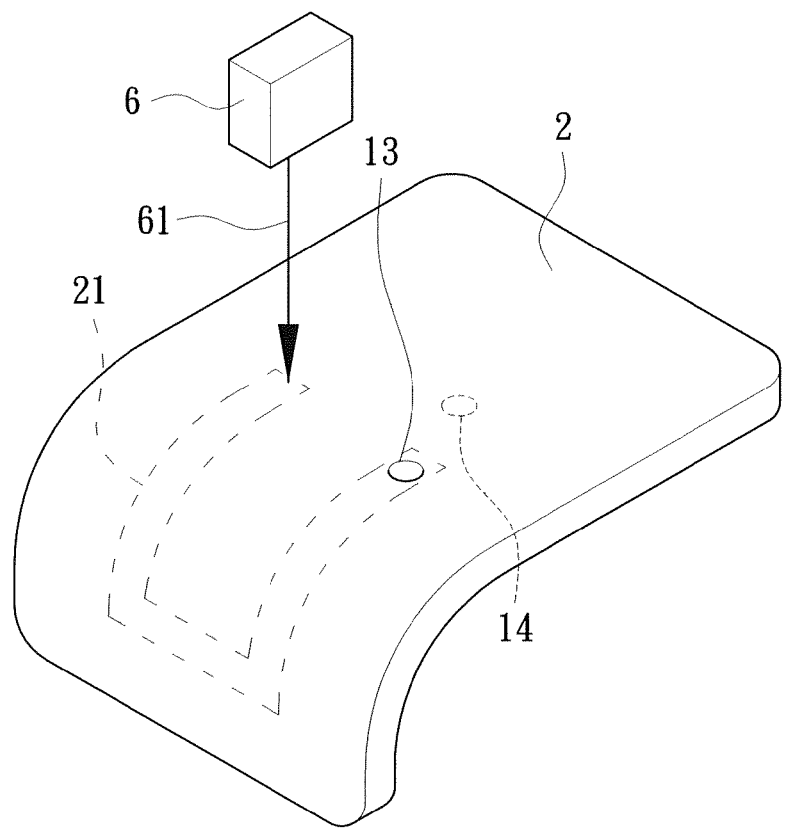
FIG. 5 is a perspective view illustrating the antenna structure with a pre-determined portion of the covering layer to be removed of the instant disclosure.
Figure 5A:
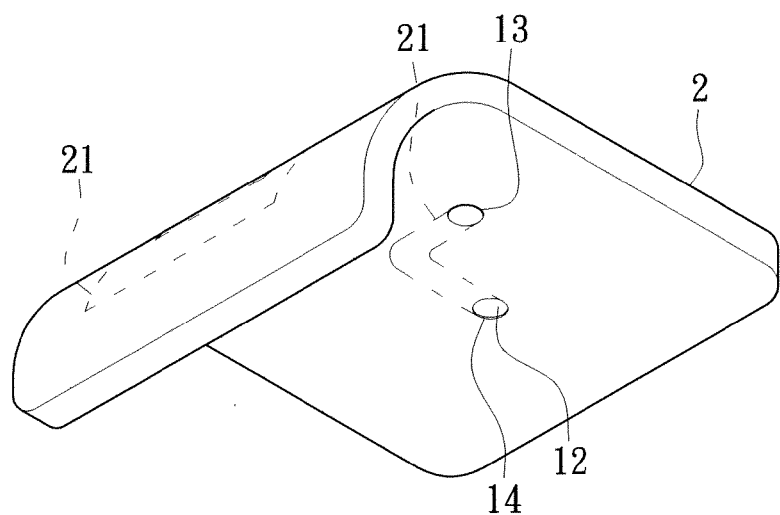
FIG. 5A is another perspective view illustrating the antenna structure with pre-determined portions of the covering layer to be removed of the instant disclosure.
Figure 6:
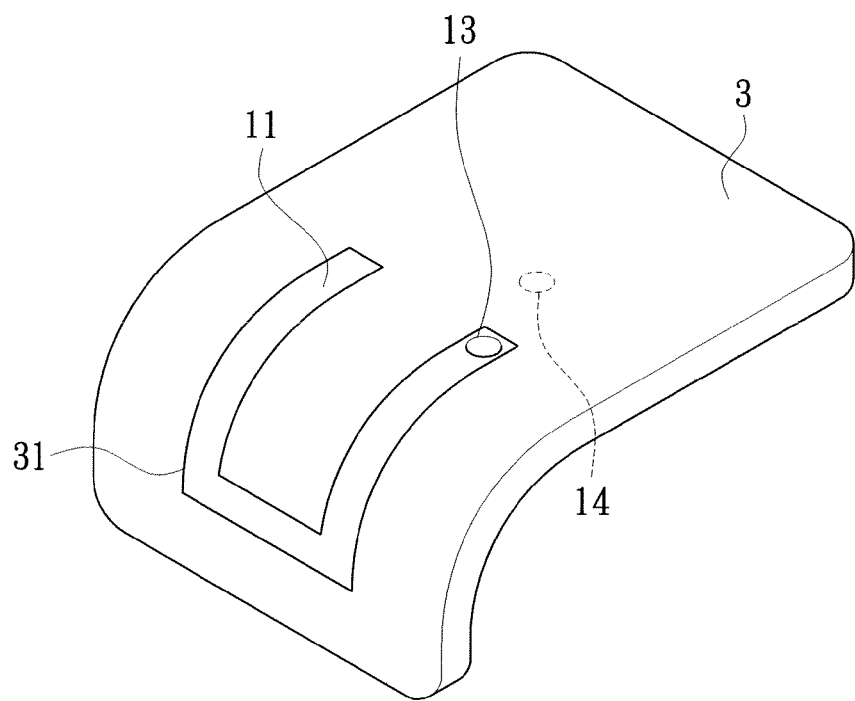
FIG. 6 is a perspective view illustrating the antenna structure with a trench formed thereon for the first embodiment of the instant disclosure.
Figure 6A:
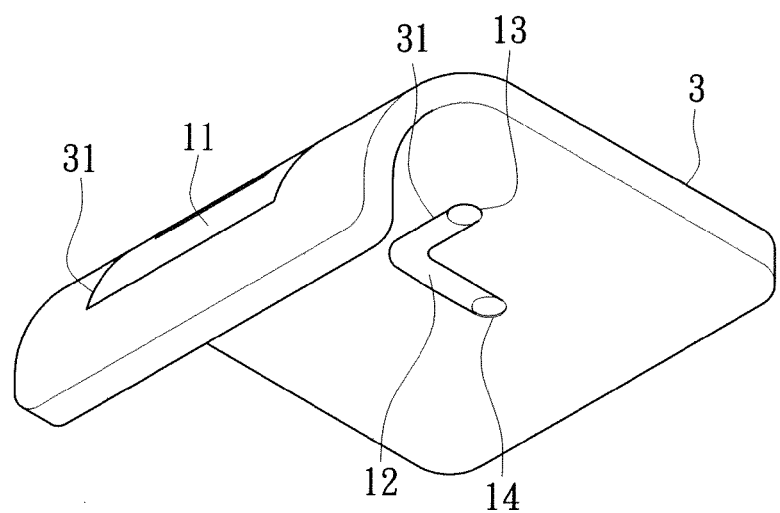
FIG. 6A is another perspective view illustrating the antenna structure with trenches formed thereon for the first embodiment of the instant disclosure.

Please refer to FIGS. 5 to 6A, wherein pre-determined portions 21 of the covering layer 2 are removed off the first and second surfaces 11 and 12. The untouched portion of the covering layer 2 is referred as patterned layer 3 hereinafter. At least one trench 31 is formed by the exposed portions of the first and second surfaces 11 and 12 of the main body 1 and the surrounding patterned layer 3. For this embodiment, separate trenches 31 are formed regarding the first surface 11 and the second surface 12, respectively. The trench 31 formed by the exposed portion of the first surface 11 of the main body 1 communicates with the through hole 13 of the main body 1. The other trench 31 formed by the exposed portion of the second surface 12 of the main body 1 communicates with the through hole 13 and the recessed spot 14 of the main body 1.

The manner for removing the pre-determined portions 21 of the covering layer 2 is by using a conventional laser machine 6 (approximately $2,000,000~3,000,000 NTD) to emit a laser light 61 with non-specific wavelength on the pre-determined portions 21 of the covering layer 2, thereby removing the pre-determined portions 21 of the covering layer 2.

When using the laser machine 6 to remove the pre-determined portions 21 of the covering layer 2, the path of the laser light 61 can be planed according to the designer, whereby the pre-determined portions 21 of the covering layer 2 can be a particular pattern, so as to cause the covering layer 2 be defined as the patterned layer 3. That is to say, the patterned layer 3 is shaped by the trenches 31.

In addition, the manner for removing the pre-determined portions 21 of the covering layer 2 can be done by using traditional technique, such as using a CNC (computer numerical control) milling machine (not shown).

Figure 7:
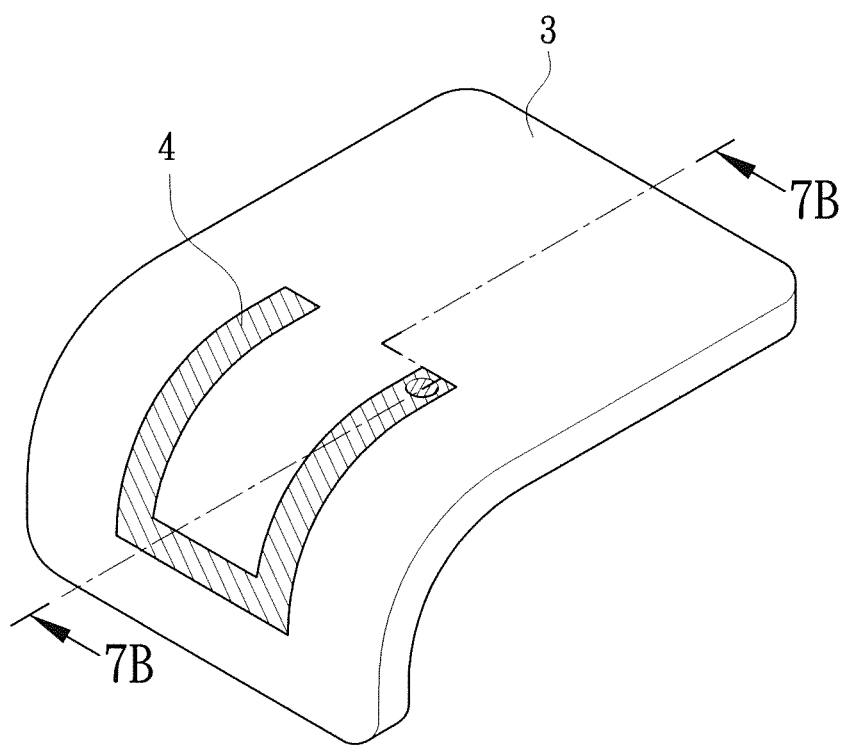
FIG. 7 is a perspective view illustrating the antenna structure formed with an antenna thereon for the first embodiment of the instant disclosure.
Figure 7A:
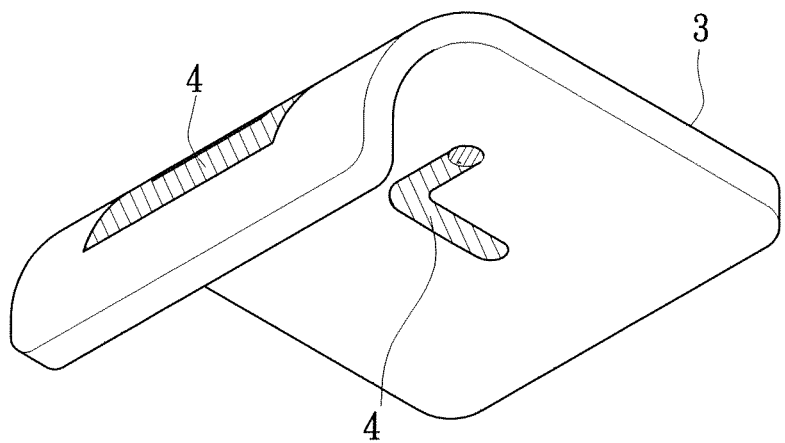
FIG. 7A is another perspective view illustrating the antenna structure formed with the antenna thereon for the first embodiment of the instant disclosure.
Figure 7B:
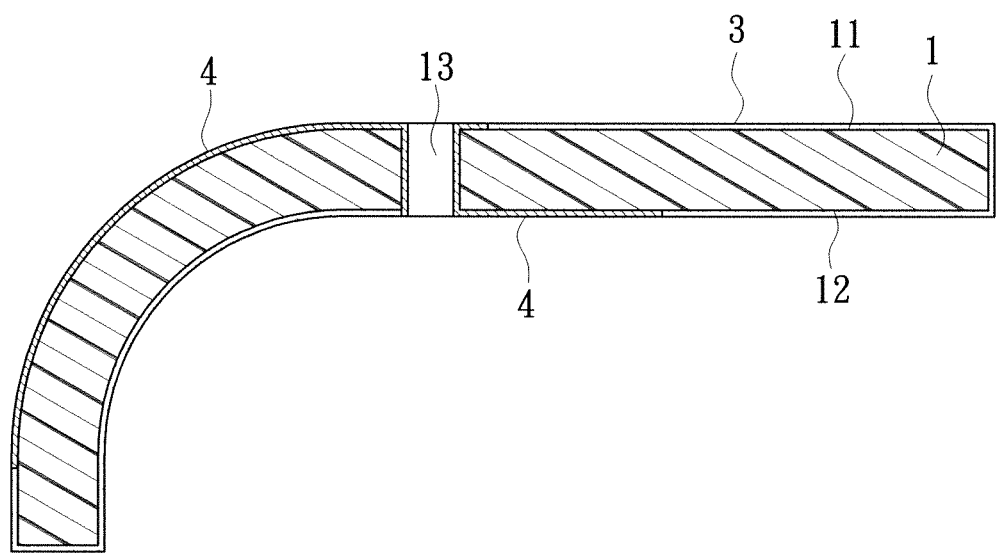
FIG. 7B shows a sectional view taken along line 7B-7B in FIG. 7.

Please refer to FIGS. 7 to 7B. An antenna material is electropated onto the side walls of the trenches 31 and the corresponding exposed portions of the first and second surfaces 11 and 12, thus forming an antenna 4. The above electroplating process is done conventionally involving chemical reactions, that is to say, the antenna material does not need to be restricted. The shape of the antenna 4 is substantially equal to the path traversed by the moving laser light 61. The path is matched by the particular pattern defined by the trenches 31.

Figure 8:
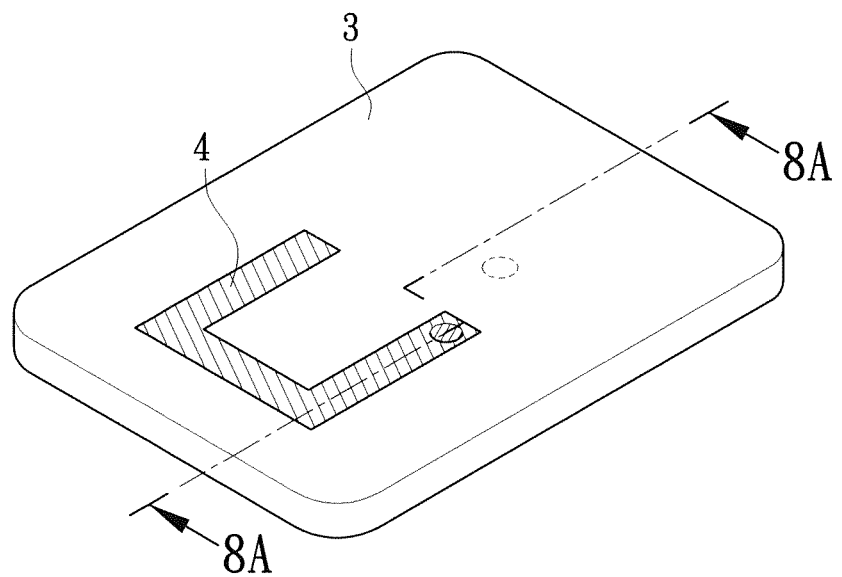
FIG. 8 is a perspective view illustrating a plate-like main body of the antenna structure for the first embodiment of the instant disclosure.
Figure 8A:
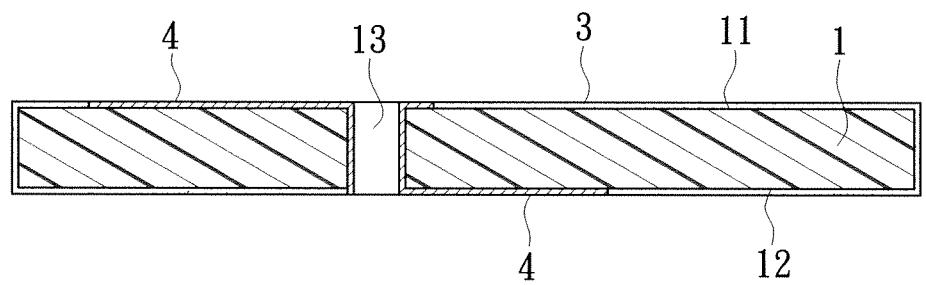
FIG. 8A is a sectional view taken along line 8A-8A in FIG. 8.

In addition, the shape of the main body 1 can be changed by the designer, for example: the main body 1 can have a curved shape (as FIGS. 7 to 7B) or a plate-like shape (as FIGS. 8 and 8A).

Therefore, the manufacturing method of the instant disclosure can reduce the capital cost compared to the LDS technique of the LPKF, so as to promote the development of the antenna industry.

According to the above steps, the instant disclosure can produce the antenna structure having the main body 1, the patterned layer 3, and the antenna 4. The antenna structure is described as follows.

Please refer to FIGS. 7 to 8A, which correspond to the antenna structure. The main body 1 has a first surface 11 and a second surface 12 formed oppositely. At least one through hole 13 is projected thru the first and second surfaces 11 and 12. The patterned layer 3 is formed on the outer surface of the main body 1. Two separate trenches 31 are formed by the patterned layer 3 with the exposed portions of the first surface 11 and the second surface 12 respectively, and both trenches 31 communicate with the through hole 13. The trenches 31 can have particular patterns. The antenna 4 is electroplated onto the inner surface of the through hole 13 and the exposed portions of the first and second surfaces 11 and 12 of the trenches 31 of the main body 1.

Figure 9:
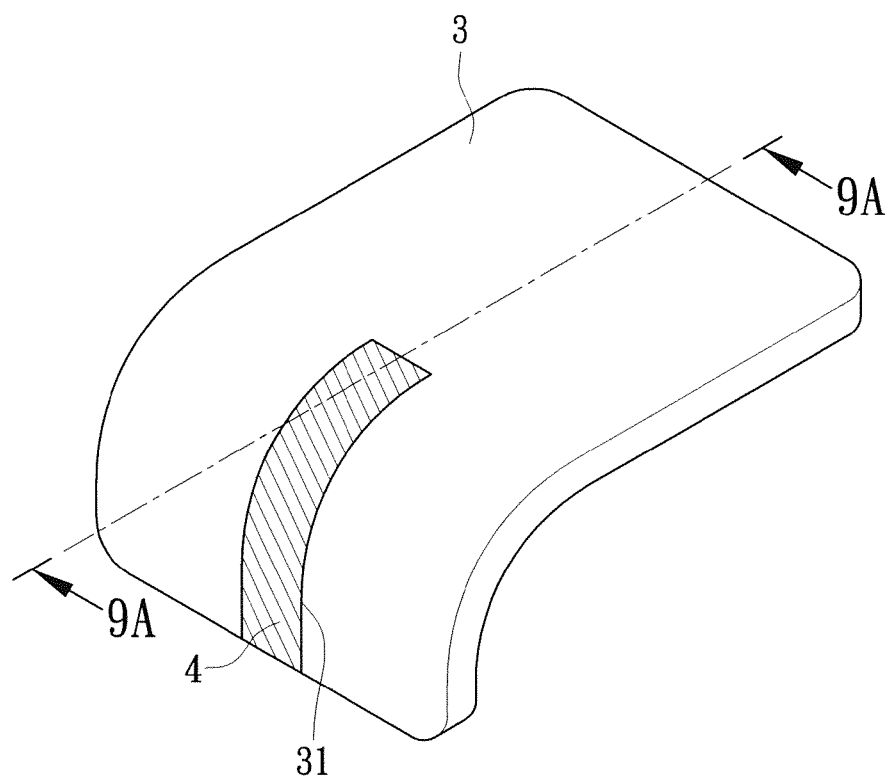
FIG. 9 is a perspective view illustrating an antenna structure for a second embodiment of the instant disclosure.
Figure 9A:
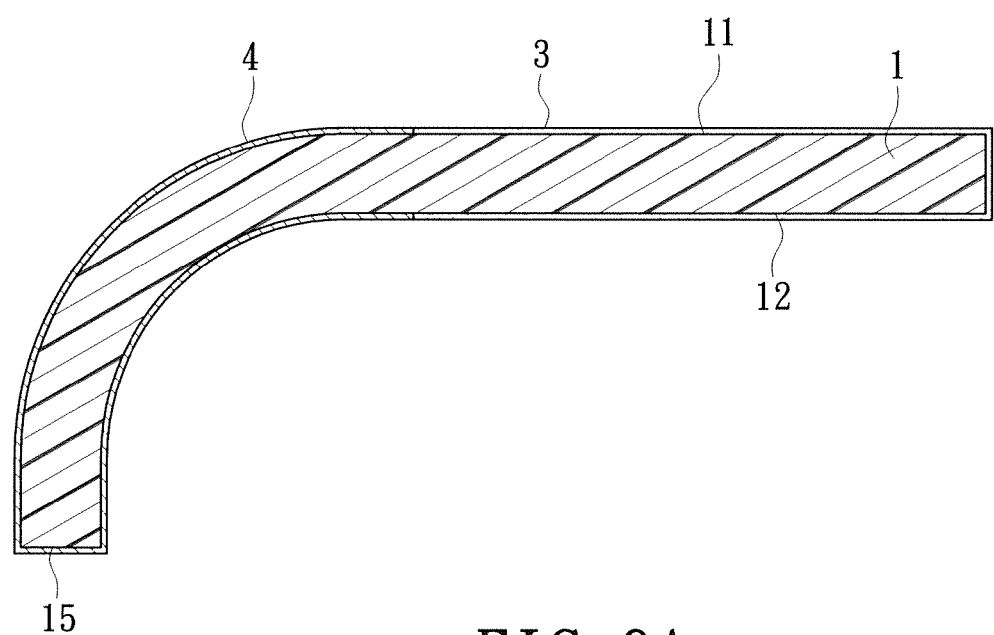
FIG. 9A shows a sectional view taken along line 9A-9A in FIG. 9.
Figure 10:
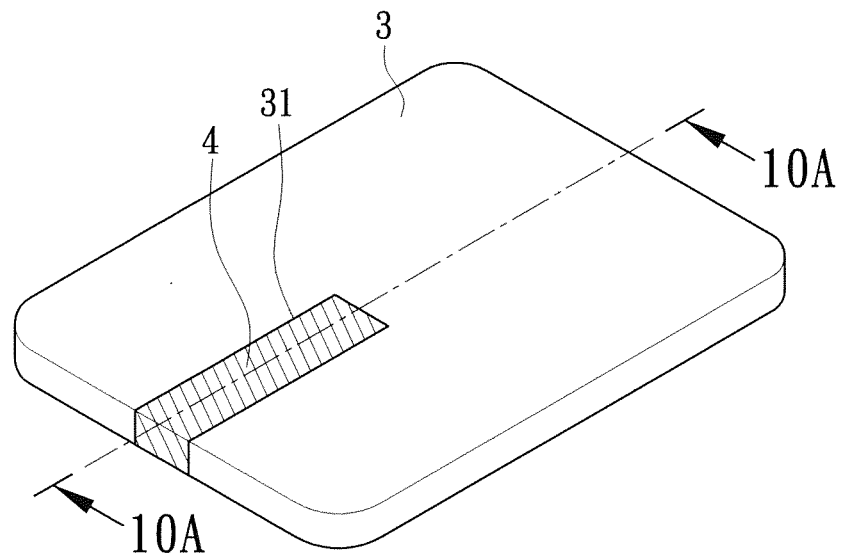
FIG. 10 is a perspective view illustrating a plate-like main body of the antenna structure of the second embodiment of the instant disclosure.
Figure 10A:
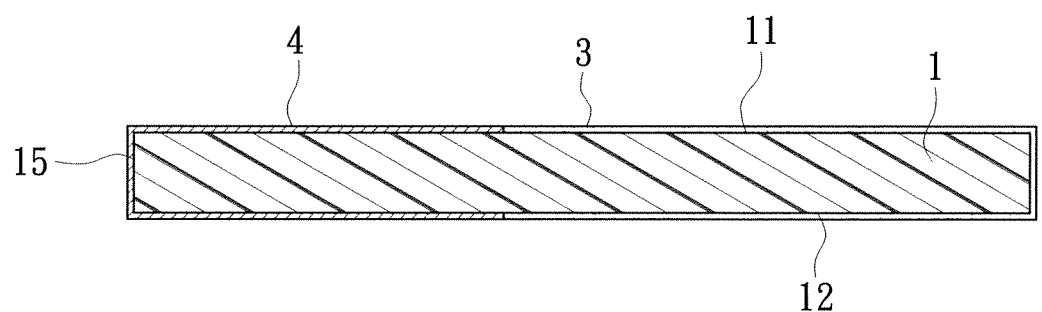
FIG. 10A shows a sectional view taken along line 10A-10A in FIG. 10.

Please refer to FIG. 9 to FIG. 10A, which show a second embodiment of the instant disclosure. The second embodiment discloses an antenna structure including a main body 1, a patterned layer 3, and an antenna 4. The shape of the main body 1 can be changed by the designer, for example: the main body 1 can have a curved shape (as shown in FIGS. 9 and 9A) or a plate-like shape (as shown in FIGS. 10 and 10A).

The main body 1 has a first surface 11 and a second surface 12 formed oppositely and an end surface 15 bridging the first and second surfaces 11 and 12. The patterned layer 3 is disposed on the outer surface of the main body 1. The pattern layer 3 and the exposed portion of the outer surface of the main body 1 define at least one trench 31. In this embodiment, the trench 31 is formed by the patterned layer 13 with the exposed portions of the first, second, and end surfaces 11, 12, and 15. The trench 31 can have a specific pattern. The antenna 4 is electroplated onto the main body 1, specifically onto the exposed portions of the first, second and end surfaces 11, 12, and 15 within the trench 31.

Comparing to related art, the antenna material and the laser machine of the instant disclosure have fewer restrictions, and the spending cost of the instant disclosure is cheaper than the LDS technique. Thus, the cost of the manufacturing method of the instant disclosure is lower than the LDS technique of the LPKF, so as to promote the development of the antenna industry. In addition, the antenna structure of the instant disclosure can be formed as an antenna having partial fine circuit or a free-dimensional antenna.

The description above only illustrates specific embodiments and examples of the instant disclosure. The instant disclosure should therefore cover various modifications and variations made to the herein-described structure and operations of the instant disclosure, provided they fall within the scope of the instant disclosure as defined in the following appended claims.

What is claimed is:

1. A manufacturing method of an antenna structure, comprising the steps of:
   producing a main body by injection molding of a plating grade first plastic, wherein the main body has a first surface and a second surface formed oppositely, at least one through hole being projected through the first and second surfaces;

covering the main body with a second plastic by injection molding in forming a covering layer, the second plastic cannot be electroplated with the first plastic simultaneously, wherein the main body is disposed inside a mold for forming the covering layer thereon, and wherein the through hole and the second surface of the main body are fixed by the mold;

removing a pre-determined portion of the covering layer, the resulting covering layer being defined as a patterned layer, at least one trench being formed by the surface of the main body exposed by the removal of the pre-determined portion with the surrounding patterned layer; and electroplating an antenna material onto the trench to form an antenna.

2. The manufacturing method as claimed in claim 1, wherein the pre-determined portion of the covering layer is removed by a laser light emitted from a laser machine.

3. The manufacturing method as claimed in claim 1, wherein the mold has at least one positioning element and a supporting column, the positioning element being projected through the through hole, the supporting column been abutted to the second surface of the main body.

\* \* \* \* \*